(12) United States Patent
Okada et al.

(10) Patent No.: US 8,541,501 B2
(45) Date of Patent: Sep. 24, 2013

(54) WATER-DISPERSED PRESSURE-SENSITIVE ADHESIVE COMPOSITION, PRESSURE-SENSITIVE ADHESIVE AND PRESSURE-SENSITIVE ADHESIVE SHEET

(75) Inventors: Mika Okada, Ibaraki (JP); Chie Kitano, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 13/643,455

(22) PCT Filed: Apr. 24, 2012

(86) PCT No.: PCT/JP2012/060943
§ 371 (c)(1),
(2), (4) Date: Oct. 25, 2012

(87) PCT Pub. No.: WO2012/160929
PCT Pub. Date: Nov. 29, 2012

(65) Prior Publication Data
US 2013/0137813 A1    May 30, 2013

(30) Foreign Application Priority Data

May 26, 2011  (JP) ................... 2011-117951
Jul. 22, 2011  (JP) ................... 2011-160387
Feb. 17, 2012  (JP) ................... 2012-033057

(51) Int. Cl.
  C08L 25/10    (2006.01)
  C08L 33/08    (2006.01)
  C08L 9/08     (2006.01)
  C08L 33/10    (2006.01)
  C08L 33/12    (2006.01)
  C08L 9/02     (2006.01)
  C08L 9/04     (2006.01)
  C08L 9/06     (2006.01)
  C08L 9/00     (2006.01)
  C08K 5/00     (2006.01)
  C08F 20/40    (2006.01)
  C08F 36/06    (2006.01)
  C08F 20/44    (2006.01)
  C08F 12/08    (2006.01)

(52) U.S. Cl.
  USPC ............. 524/855; 524/81; 524/523; 524/539; 524/856; 526/327; 526/335; 526/341; 526/346

(58) Field of Classification Search
  USPC .................. 524/81, 501, 502, 515, 523, 539, 524/855, 856; 526/319, 327, 335, 341, 346; 528/271
  See application file for complete search history.

(56) References Cited

U.S. PATENT DOCUMENTS
5,290,842 A  * 3/1994  Sasaki et al. .................. 524/271
2010/0304104 A1  12/2010  Nagasaki et al.

FOREIGN PATENT DOCUMENTS
| JP | 1-306483 A | 12/1989 |
|----|----|----|
| JP | 3-034786 B2 | 5/1991 |
| JP | 3-243679 A | 10/1991 |
| JP | 10-102019 A | 4/1998 |
| JP | 2007-277476 A | 10/2007 |
| JP | 2008-150494 A | 7/2008 |
| JP | 2008-163095 A | 7/2008 |
| JP | 2009-132038 A | 6/2009 |

* cited by examiner

Primary Examiner — Karuna P Reddy
(74) Attorney, Agent, or Firm — Sughrue Mion, PLLC (57) ABSTRACT

Provided is a water-dispersed pressure-sensitive adhesive composition capable of forming a pressure-sensitive adhesive that exhibits good adhesiveness to a non-polar adherend and maintains its properties at a low temperature. The water-dispersed pressure-sensitive adhesive composition according to the present invention comprises a (meth)acrylic polymer obtained by polymerizing a monomer composition containing as a primary component an alkyl (meth)acrylate having an alkyl group with 1 to 18 carbon atoms, a latex containing a rubber component that is immiscible with the (meth)acrylic polymer and has a loss tangent peak temperature of $-5°$ C. or below when determined by a dynamic viscoelastic measurement in which shear strain is applied at a frequency of 1 Hz, and a tackifier that is miscible with the rubber component, but immiscible with the (meth)acrylic polymer.

20 Claims, 2 Drawing Sheets

WATER-DISPERSED PRESSURE-SENSITIVE ADHESIVE COMPOSITION, PRESSURE-SENSITIVE ADHESIVE AND PRESSURE-SENSITIVE ADHESIVE SHEET

CROSS REFERENCE TO RELATED APPLICATIONS

This application is a National stage of PCT/JP2012/060943 filed Apr. 24, 2012, the contents of which are incorporated herein by reference in their entirety.

TECHNICAL FIELD

The present invention relates to a water-dispersed pressure-sensitive adhesive composition used for pressure-sensitive adhesives, etc., as well as a pressure-sensitive adhesive and a pressure-sensitive adhesive sheet each formed of the composition. The present application claims priority to Japanese Patent Application No. 2011-117951 filed on May 26, 2011, Japanese Patent Application No. 2011-160387 filed on Jul. 22, 2011, and Japanese Patent Application No. 2012-033057 filed on Feb. 17, 2012, and the entire contents of these applications are incorporated in the present application as reference.

BACKGROUND ART

In recent years, from the standpoint of environmental stress, reduction of organic solvent usage has been desired. With respect to the pressure-sensitive adhesive (PSA) composition laminated on a PSA sheet, it has been also underway to shift from solvent-based PSA compositions where an organic solvent is used as the solvating media to water-dispersed PSA compositions where water is used as the dispersion media.

As such a PSA, an acrylic PSA has been widely used because of its versatility. However, there exists a problem such that an acrylic PSA, in general, is poorly adhesive to a non-polar adherend such as polyethylene and polypropylene.

In order to solve this kind of problem, in a disclosed method, a tackifying resin having a high softening point is added (e.g., see Patent Document 1). Also disclosed is a PSA that comprises an acrylic polymer and a rubber-based PSA, and further comprises a rosin-based tackifying resin, whereby the PSA exhibits good adhesiveness to a non-polar adherend even at a low temperature (e.g., see Patent Document 2).

CITATION LIST

[Patent Literatures]
[Patent Document 1] Japanese Patent Application Publication No. H3-34786
[Patent Document 2] Japanese Patent Application Publication No. 2008-163095

SUMMARY OF INVENTION

Technical Problem

What has been desired is, however, a water-dispersed PSA composition capable of forming a PSA having yet better adhesive strength to a non-polar adherend at a low temperature than the emulsion-based PSA's described in Patent Documents 1 and 2.

An objective of the present invention is to provide a water-dispersed PSA composition capable of forming a PSA that exhibits good adhesiveness to a non-polar adherend such as polyethylene and polypropylene, and further, maintains its properties even at a low temperature.

Solution to Problem

The present inventors have earnestly researched in order to solve the problem. As a result, they discovered that in a water-dispersed PSA composition comprising a (meth)acrylic polymer, a latex containing a rubber component that is immiscible with the (meth)acrylic polymer and has a low glass transition temperature, and a tackifier, using a tackifier that is miscible with the rubber component, but immiscible with the acrylic polymer as the tackifier to form the water-dispersed PSA composition enables formation of a PSA that exhibits good adhesiveness to a non-polar adherend, and further, maintains its properties even at a low temperature; and they have completed the present invention.

It is considered that in the water-dispersed PSA composition according to Patent Document 2, because it uses a tackifier miscible with an acrylic polymer, the modulus of elasticity of the rubber-based PSA component cannot be sufficiently reduced and thus a sufficient adhesive strength cannot be obtained. Additionally, one of the factors giving rise to an insufficient adhesive strength is considered to be that because the tackifying resin mixes homogeneously with the acrylic polymer, the Tg of the acrylic polymer is increased and the modulus of elasticity of the acrylic polymer becomes greater at a low temperature.

More specifically, the water-dispersed PSA composition according to the present invention comprises a (meth)acrylic polymer obtained by polymerizing a monomer composition comprising, as a primary component, an alkyl (meth)acrylate having an alkyl group with 1 to 18 carbon atoms; a latex containing a rubber component, with the rubber component being immiscible with the (meth)acrylic polymer and having a loss tangent peak temperature of $-5°$ C. or below when determined by a dynamic viscoelastic measurement in which shear strain is applied at a frequency of 1 Hz; and a tackifier that is miscible with the rubber component, but immiscible with the (meth)acrylic polymer.

In the water-dispersed PSA composition according to the present invention, the ratio of the (meth)acrylic polymer to the latex ((meth)acrylic polymer/rubber-based latex) is preferably in a range of 95/5 to 25/75 based on solid contents.

The water-dispersed PSA composition according to the present invention preferably comprises the tackifier in an amount within a range of 5 to 100 parts by weight relative to 100 parts by weight of solid contents of the latex.

Furthermore, in the water-dispersed PSA composition according to the present invention, it is preferable that the water-dispersed PSA composition after pre-drying has a storage modulus of 1 MPa or smaller over a range of $-15°$ C. to $25°$ C. when determined by a dynamic viscoelastic measurement in which shear strain is applied at a frequency of 1 Hz.

In the water-dispersed PSA composition according to the present invention, the rubber component contained in the latex is preferably at least one kind selected from a group consisting of natural rubbers, synthesized polyisoprene rubbers, polybutadiene rubbers, acrylonitrile-butadiene rubbers and styrene-butadiene rubbers.

Furthermore, in the water-dispersed PSA composition according to the present invention, the tackifier preferably has a softening point of $80°$ C. to $150°$ C.

The PSA according to the present invention is formed using a water-dispersed PSA composition according to the present invention described above.

The PSA sheet according to the present invention comprises a PSA layer formed using the water-dispersed PSA composition according to the present invention described above.

Advantageous Effects of Invention

The present invention provides a water-dispersed PSA composition capable of forming a PSA that exhibits good adhesiveness to a non-polar adherend such as polyethylene and polypropylene and maintains its properties even at a low temperature.

DESCRIPTION OF EMBODIMENTS

Particulars of the present invention are described below.

It is noted that "A to B" indicating a range means "A or greater, but B or smaller" and various physical properties given in the present description refer to values measured by the methods described in Examples described later unless otherwise noted. In the present description, "(meth)acryl" in "(meth)acrylic polymer" and the like means "acryl and/or methacryl". In addition, "water-dispersed" in the present description refers to a state where components are at least partially dispersed in water, and for instance, "water-dispersed PSA composition" refers to a composition comprising a PSA composition and water and being in a state where the PSA composition is partially dispersed in water. It is noted that the term "dispersed" refers to a state where at least part of components are not dissolved in water, including also a suspended state and an emulsified state.

(I) Water-Dispersed PSA Composition

The water-dispersed PSA composition according to the present invention comprises a (meth)acrylic polymer obtained by polymerizing a monomer composition comprising, as a primary component, an alkyl (meth)acrylate having an alkyl group with 1 to 18 carbon atoms; a latex containing a rubber component, with the rubber component being immiscible with the (meth)acrylic polymer and having a loss tangent peak temperature of −5° C. or below when determined by a dynamic viscoelastic measurement in which shear strain is applied at a frequency of 1 Hz; and a tackifier that is miscible with the rubber component, but immiscible with the (meth)acrylic polymer.

The rubber component has good adhesiveness to a non-polar adherend and the aforementioned rubber component has a low Tg of −25° C. or below; and therefore, it has a low modulus of elasticity at a low temperature and good wettability to an adherend in a low temperature environment.

In the water-dispersed PSA composition according to the present invention, it is considered that because the (meth) acrylic polymer and the rubber component are immiscible with each other, when a PSA layer is formed, the acrylic phase constituted primarily from the (meth)acrylic polymer and the rubber phase constituted primarily from the rubber component form a sea-island structure. As a result, it is considered that, on a PSA layer surface, the acrylic phase and the rubber phase are present where the acrylic phase ensures adhesiveness to a polar adherend such as SUS, etc., and the rubber phase provides adhesiveness to a non-polar adherend such as polypropylene (PP), etc., and adhesiveness at a low temperature.

Moreover, in the water-dispersed PSA composition according to the present invention, because it comprises a tackifier that is miscible with the rubber component, but immiscible with the (meth)acrylic polymer, the modulus of elasticity of the rubber phase decreases over a wide range of temperature including a low temperature, whereby the wettability to an adherend increases to produce yet better adhesive strength.

The respective components are described below.

(i) (Meth)acrylic Polymer

The (meth)acrylic polymer can be obtained by polymerizing a monomer composition comprising, as a primary component, an alkyl (meth)acrylate having an alkyl group with 1 to 18 carbon atoms. The monomer composition may comprise, as desired, a functional-group-containing unsaturated monomer or an unsaturated monomer copolymerizable with the alkyl (meth)acrylate or the functional-group-containing unsaturated monomer.

The alkyl (meth)acrylate having an alkyl group with 1 to 18 carbon atoms include compounds represented by the following general formula (1):

[Chem. 1]

$$H_2C=CR^1COOR^2 \tag{1}$$

(in general formula (1), $R^1$ is a hydrogen atom or a methyl group and $R^2$ is an straight-chained or branched alkyl group having 1 to 18 carbon atoms.)

Specific examples of $R^2$ in general formula (1) include methyl group, ethyl group, propyl group, isopropyl group, butyl group, isobutyl group, sec-butyl group, t-butyl group, pentyl group, neopentyl group, isoamyl group, hexyl group, heptyl group, octyl group, 2-ethylhexyl group, isooctyl group, nonyl group, isononyl group, decyl group, isodecyl group, undecyl group, dodecyl group, tridecyl group, tetradecyl group, pentadecyl group, hexadecyl group, heptadecyl group, octadecyl group, and so on.

Specific examples of the alkyl (meth)acrylate represented by general formula (1) include methyl (meth)acrylate, ethyl (meth)acrylate, propyl (meth)acrylate, isopropyl (meth)acrylate, butyl (meth)acrylate, isobutyl (meth)acrylate, sec butyl (meth)acrylate, t-butyl (meth)acrylate, pentyl (meth)acrylate, neopentyl (meth)acrylate, isoamyl (meth)acrylate, hexyl (meth)acrylate, heptyl (meth)acrylate, octyl (meth)acrylate, 2-ethylhexyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth)acrylate, tridecyl (meth)acrylate, tetradecyl (meth) acrylate, pentadecyl (meth)acrylate, hexadecyl (meth) acrylate, heptadecyl (meth)acrylate, octadecyl (meth) acrylate, and so on. These alkyl (meth)acrylates can be used singly or in combination of two or more kinds.

The number of carbon atoms of the alkyl group in the alkyl (meth)acrylate is preferably 2 to 18, or more preferably 4 to 12.

The amount of the alkyl (meth)acrylate to be added can be, for instance, 60 to 99.5 parts by weight or preferably 70 to 99 parts by weight relative to 100 parts by weight of a total amount of the monomer composition.

Examples of the functional-group-containing unsaturated monomer include carboxyl-group-containing unsaturated monomers.

Carboxyl-group-containing monomers include unsaturated carboxylic acids such as (meth)acrylic acid, itaconic acid, maleic acid, fumaric acid, crotonic acid, cinammic acid, etc.; monoesters of unsaturated dicarboxylic acids such as monomethyl itaconate, monobutyl itaconate, 2-acryloyloxyethyl phthalate, etc.; monoesters of unsaturated tricarboxylic acids such as 2-methacryloyloxyethyl trimellitate, 2-methacryloyloxyethyl pyromellitate, etc.; carboxyalkyl acrylates such as carboxyethyl acrylates (β-carboxyethyl acrylate, etc.), carboxypentyl acrylates, etc.; acrylic acid dimer, acrylic acid trimer; anhydrides of unsaturated dicarboxylic acids such as itaconic acid anhydride, maleic acid anhydride, fumaric acid anhydride, etc.; and so on.

Examples of the functional-group-containing unsaturated monomer other than the carboxyl-group-containing unsaturated monomers include hydroxyl-group-containing unsaturated monomers such as 2-hydroxyethyl acrylate, 2-hydroxypropyl acrylate, 4-hydroxybutyl acrylate, etc.; amide-group-containing unsaturated monomers such as (meth) acrylamide, N,N-dimethyl (meth)acrylamide, N,N-diethyl (meth)acrylamide, N-isopropyl (meth)acrylamide, N-butyl (meth)acrylamide, N-methoxymethyl (meth)acrylamide, N-methylol (meth)acrylamide, N-methylolpropane (meth) acrylamide, etc; amino-group-containing unsaturated monomers such as aminoethyl (meth)acrylate, N,N-dimethylaminoethyl (meth)acrylate, t-butylaminoethyl (meth)acrylate, etc.; glycidyl-group-containing unsaturated monomers such as glycidyl (meth)acrylate, methylglycidyl (meth)acrylate, etc.; cyano-group-containing unsaturated monomers such as (meth)acrylonitrile, etc.; maleimide-group-containing monomers such as N-cyclohexyl maleimide, N-isopropyl maleimide, N-lauryl maleimide, N-phenyl maleimide, etc.; itaconimide-group-containing monomers such as N-methyl itaconimide, N-ethyl itaconimide, N-butyl itaconimide, N-octyl itaconimide, N-2-ethylhexylitaconimide, N-cyclohexyl itaconimide, N-lauryl itaconimide, etc.; succinimide-group-containing monomers such as N-(meth)acryloyloxymethylene succinimide, N-(meth)acryloyl-6-oxyhexamethylene succinimide, N-(meth)acryloyl-8-oxyoctamethylene succinimide, etc.; vinyl-group-containing heterocyclic compounds such as N-vinylpyrrolidone, N-(1-methylvinyl)pyrrolidone, N-vinylpyridine, N-vinylpiperidone, N-vinylpyrimidine, N-vinylpiperazine, N-vinylpyrazine, N-vinylpyrrole, N-vinylimidazole, N-vinyloxazole, N-vinylmorpholine, (meth)acryloylmorpholine, etc.; sulfonate-group-containing unsaturated monomers such as styrene sulfonate, allylsulfonate, 2-(meth)acrylamide-2-methyl propane sulfonate, (meth)acrylamide propane sulfonate, sulfopropyl (meth)acrylate, (meth)acryloxynaphthalene sulfonate, etc.; phosphate-group-containing unsaturated monomers such as 2-hydroxyethylacryloyl phosphate, etc.; functional monomers such as 2-methacryloyloxyethyl isocyanate, etc.; as well as N-vinyl carboxylic acid amides, and so on.

The amount of the functional-group-containing unsaturated monomer to be added is, for instance, 0.5 to 12 parts by weight or preferably 1 to 10 parts by weight relative to 100 parts by weight of a total amount of the monomer composition.

Examples of an unsaturated monomer copolymerizable with the alkyl (meth)acrylate and the functional-group-containing unsaturated monomers include vinylester-group-containing monomers such as vinyl acetate, etc.; unsaturated aromatic monomers such as styrene, vinyltoluene, etc.; (meth)acrylic acid alicyclic hydrocarbon ester monomers such as cyclopentyl di(meth)acrylate, isobornyl (meth)acrylate, etc.; alkoxy-group-containing unsaturated monomers such as methoxyethyl (meth)acrylate, ethoxyethyl (meth) acrylate, etc.; olefinic monomers such as ethylene, propylene, isoprene, butadiene, isobutylene, etc.; vinyl-ether-based monomers such as vinyl ether, etc.; halogen-atom-containing unsaturated monomers such as vinyl chloride, etc.; and others such as tetrahydrofurfiuyl (meth)acrylate, heterocyclic compounds of fluoro(meth)acrylates, etc., acrylic-acid-ester-based monomers containing a halogen atom, and so on.

The monomer composition may further comprise a multi-functional monomer. Examples of the multi-functional monomer include (mono or poly)ethylene glycol di(meth) acrylates such as ethylene glycol di(meth)acrylate, diethylene glycol di(meth)acrylate, triethylene glycol di(meth)acrylate, trimethylolpropane tri(meth)acrylate, tetraethylene glycol di(meth)acrylate, etc.; (mono or poly)alkylene glycol di(meth)acrylates such as (mono or poly)propylene glycol di(meth)acrylates, etc., such as propylene glycol di(meth) acrylate, etc.; as well as (meth)acrylic acid esters of polyols such as neopentyl glycol di(meth)acrylate, 1,6-hexane-di-ol di(meth)acrylate, tetramethylolmethane tri(meth)acrylate, pentaerythritol di(meth)acrylate, trimethylolpropane tri (meth)acrylate, pentaerythritol tri(meth)acrylate, dipentaerythritol hexa(meth)acrylate, etc.; divinylbenzene; and so on. Other Examples of the multi-functional monomer include epoxy acrylates, polyester acrylates, urethane acrylates and the like.

The monomer composition may further comprise an alkoxysilyl-group-containing vinyl monomer. The alkoxysilyl-group-containing vinyl monomer includes silicone-based (meth)acrylate monomers, silicone-based vinyl monomers, and so on.

Examples of the silicone-based (meth)acrylate monomer include (meth)acryloxyalkyl-trialkoxysilanes such as (meth) acryloxymethyl-trimethoxysilane, (meth)acryloxymethyl-triethoxysilane, 2-(meth)acryloxyethyl-trimethoxysilane, 2-(meth)acryloxyethyl-triethoxysilane, 3-(meth)acryloxypropyl-trimethoxysilane, 3-(meth)acryloxypropyl-triethoxysilane, 3-(meth)acryloxypropyl-tripropoxysilane, 3-(meth) acryloxypropyl-triisopropoxysilane, 3-(meth) acryloxypropyl-tributoxysilane, etc.; (meth)acryloxyalkyl alkyl-dialkoxysilanes such as (meth)acryloxymethyl-methyldimethoxysilane, (meth)acryloxymethyl-methyldiethoxysilane, 2-(meth)acryloxyethyl-methyldimethoxysilane, 2-(meth)acryloxyethyl-methyldiethoxysilane, 3-(meth)acryloxypropyl-methyldimethoxysilane, 3-(meth)acryloxypropyl-methyldiethoxysilane, 3-(meth)acryloxypropyl-methyldipropoxysilane, 3-(meth)acryloxypropyl-methyldiisopropoxysilane, 3-(meth)acryloxypropyl-methyldibutoxysilane, 3-(meth)acryloxypropyl-ethyldimethoxysilane, 3-(meth)acryloxypropyl-ethyldiethoxysilane, 3-(meth)acryloxypropyl-ethyldipropoxysilane, 3-(meth)acryloxypropyl-ethyldiisopropoxysilane, 3-(meth)acryloxypropyl-ethyldibutoxysilane, 3-(meth)acryloxypropyl-propyldimethoxysilane, 3-(meth)acryloxypropyl-propyldiethoxysilane, etc.; and their corresponding (meth) acryloxyalkyl-dialkyl(mono)alkoxysilanes; and so on.

Examples of the silicone-based vinyl monomer include vinyltrialkoxysilanes such as vinyltrimethoxysilane, vinyltriethoxysilane, vinyltripropoxysilane, vinyltriisopropoxysilane, vinyltributoxysilane, etc.; their corresponding vinylalkyldialkoxysilanes and vinyldialkylalkoxysilanes;

vinylalkyltrialkoxysilanes such as vinylmethyltrimethoxysilane, vinylmethyltriethoxysilane, β-vinylethyltrimethoxysilane, β-vinylethyltriethoxysilane, γ-vinylpropyltrimethoxysilane, γ-vinylpropyltriethoxysilane, γ-vinylpropyltripropoxysilane, γ-vinylpropyltriisopropoxysilane, γ-vinylpropyltributoxysilane, etc.; and their corresponding (vinylalkyl)alkyldialkoxysilanes and (vinylalkyl)dialkyl(mono)alkoxysilanes; and so on.

By using an alkoxysilyl-group-containing vinyl monomer, alkoxysilyl groups are introduced into the polymer chains and reactions among the silyl groups allow formation of a crosslinked structure. These alkoxysilyl-group-containing vinyl monomers can be used singly or in combination, as appropriate.

The amount of these alkoxysilyl-group-containing vinyl monomers to be added is, for instance, within a range greater than 0 part by weight up to 40 parts by weight or preferably within a range greater than 0 part by weigh up to 30 parts by weight relative to 100 parts by weight of the alkyl (meth)acrylate.

The (meth)acrylic polymer according to the present invention can be obtained, for instance, by polymerizing the monomer composition described above by a polymerization method such as emulsion polymerization, etc.

In emulsion polymerization, for instance, polymerization is carried out by suitably mixing in water a polymerization initiator, an emulsifier, and as necessary a chain transfer agent, etc., along with the monomer composition. More specifically, for example, can be employed a known emulsion polymerization method such as all-at-once supply method (one batch polymerization method), monomer dropping method, monomer emulsion dropping method, etc. In monomer dropping method, can be suitably selected either continuous dropping or portionwise dropping. Although the reaction conditions, etc. can be appropriately selected, the polymerization temperature is, for instance, 20° C. to 100° C.

The polymerization initiator is not particularly limited and a polymerization initiator usually used in emulsion polymerization can be used. Examples include azo-based initiators such as 2,2'-azobisisobutyronitrile, 2,2'-azobis(2-methylpropionamidine)disulfate salt, 2,2'-azobis(2-methylpropionamidine)dihydrochloride salt, 2,2'-azobis(2-amidinopropane)dihydrochloride salt, 2,2'-azobis[N-(2-carboxyethyl)-2-methylpropionamidine]hydrate, 2,2'-azobis(N,N'-dimethylene isobutylamidine), 2,2'-azobis[2-(2-imidazolin-2-yl)propane]dihydrochloride salt, etc.; persulfate salt-based initiators such as potassium persulfate, ammonium persulfate, etc.; peroxide-based initiators such as benzoyl peroxide, t-butyl hydroperoxide, hydrogen peroxide, etc.; substituted ethane-based initiators such as phenyl-substituted ethane, etc.; carbonyl-based initiators such as aromatic carbonyl compounds, etc.; redox-based initiators such as a combination of a persulfate salt and sodium hydrogen sulfite, a combination of a peroxide and sodium ascorbate, etc.; and so on.

These polymerization initiators are used singly or in combination, as appropriate. Although the amount of the polymerization initiator to be added can be suitably selected, it is, for instance, 0.005 to 1 part by weight or preferably 0.01 to 0.8 part by weight relative to 100 parts by weight of a total amount of the monomer composition.

The emulsifier is not particularly limited and an emulsifier usually used in emulsion polymerization can be used. Examples include anionic emulsifiers such as sodium lauryl sulfate, ammonium lauryl sulfate, sodium dodecyl benzene sulfonate, sodium polyoxyethylene lauryl sulfate, sodium polyoxyethylene alkyl ether sulfates, ammonium polyoxyethylene alkyl phenyl ether sulfates, sodium polyoxyethylene alkyl phenyl ether sulfates, sodium polyoxyethylene alkyl sulfosuccinates, etc.; non-ionic emulsifiers include polyoxyethylene alkyl ethers, polyoxyethylene alkyl phenyl ethers, polyoxyethylene aliphatic acid esters, polyoxyethylene-polyoxypropylene block polymers, etc.; and so on. Alternatively, may be used radically polymerizable (reactive) emulsifiers (e.g., HS-10 (available from Dai-Ichi Kogyo Seiyaku Co., Ltd.)) having structures of these anionic emulsifiers or non-ionic emulsifiers in which radically polymerizable (reactive) groups such as propenyl group, ally ether group, etc., have been introduced.

These emulsifiers can be used singly or in combination, as appropriate. The amount of the emulsifier to be added is, for instance, 0.2 to 10 parts by weight or preferably 0.5 to 5 parts by weight relative to 100 parts by weight of a total amount of the monomer composition.

Chain transfer agent adjusts the molecular weight of a polymer as necessary and a chain transfer agent usually used in emulsion polymerization is used. Examples include mercaptans such as 1-dodecanethiol, mercaptoacetic acid, 2-mercaptoethanol, 2-ethylhexyl thioglycolate, 2,3-dimethylmercapto-1-propanol, and so on. These chain transfer agents are used singly or in combination, as appropriate. The amount of the chain transfer agent to be added is, for instance, 0.001 to 0.5 part by weight relative to 100 parts by weight of a total amount of the monomer composition.

In order to increase the stability of the (meth)acrylic polymer, for instance, with aqueous ammonia, etc., it can be adjusted to, for example, pH 7 to 9 or preferably to pH 7 to 8.

(ii) Latex Containing a Rubber Component

The water-dispersed PSA composition according to the present invention comprises a latex containing a rubber component (which hereinafter may be referred to as "rubber-based latex"), wherein the rubber component is immiscible with the (meth)acrylic polymer and has a loss tangent peak temperature of −5° C. or below when determined by a dynamic viscoelastic measurement in which shear strain is applied at a frequency of 1 Hz.

It is noted that the dynamic viscoelastic measurement performed with shear strain applied at a frequency of 1 Hz can be carried out by the same method as in the "(5) Dynamic viscoelastic measurement of PSA sheet" in Examples described later.

The rubber component preferably has a loss tangent peak temperature of −5° C. or below, preferably −10° C. or below, or more preferably −15° C. or below. When the rubber component has a loss tangent peak temperature above this range, the modulus of elasticity at a low temperature increases, and thus the adhesive strength tends to decrease. In other words, by adjusting the loss tangent peak temperature to be within the range described above, the modulus of elasticity at a low temperature can be decreased and the adhesive strength at a low temperature can be increased. Although the lower limit is not particularly limited for the loss tangent peak temperature of the rubber component, it can be, for instance, −130° C. or above, preferably −120° C. or above, or more preferably −110° C. or above.

Examples of the rubber-based latex include natural rubber latex and synthetic rubber-based latex. Natural rubber latex can be modified natural rubbers obtained by grafting an alkyl (meth)acrylate, etc., on a natural rubber.

Synthetic rubber-based latex is an aqueous dispersion of a synthetic polymer. The variety of synthetic polymers include polyisoprenes, styrene-butadiene copolymers (SBR), styrene-butadiene-vinylpyridine-based polymers, polybutadiene-based polymers, methyl-methacrylate-butadiene-based copolymers, acrylonitrile-butadiene-based polymers (NBR), polychloroprenes (CR), and so on.

It is noted that a person of ordinary skill in the art can figure out how to obtain a latex containing a rubber component that has a loss tangent peak temperature within the range described above and is immiscible with the (meth)acrylic polymer, by modifying the composition through adjustment of the compositional ratio (copolymerization ratio) of the rubber component based on the contents of description of the present application including the specific examples described later as well as general technical knowledge such as solubility parameter (sp) values, etc.

As such a rubber-based latex, a commercial product can be used. Examples of a styrene-butadiene latex include products available from Zeon Corporation (NIPOL series), JSR Corporation, Asahi Kasei Chemicals Corporation, DIC Corporation (LACSTAR series), Nippon A&L Inc. (NALSTAR series), etc. Examples of styrene-butadiene-vinylpyridine latex include products available from Zeon Corporation (NIPOL series), Nippon A&L Corporation (PYRATEX series), etc. Examples of polybutadiene latex include products available from Zeon Corporation (NIPOL series). Examples of MMA-polybutadiene latex include products available from Nippon A&L Corporation (NALSTAR series), etc. Examples of acrylonitrile-butadiene latex include products available from Zeon Corporation (NIPOL series), Nippon A&L Corporation (CYATEX series), DIC Corporation (LACSTAR series), etc. Examples of chloroprene latex include products available from Showa Denko K. K. (SHOPRENE series), Tosoh Corporation (SKYPRENE series), etc. Either one of these rubber-based latexes can be used as long as its rubber component is immiscible with the (meth)acrylic polymer.

Figure 1:
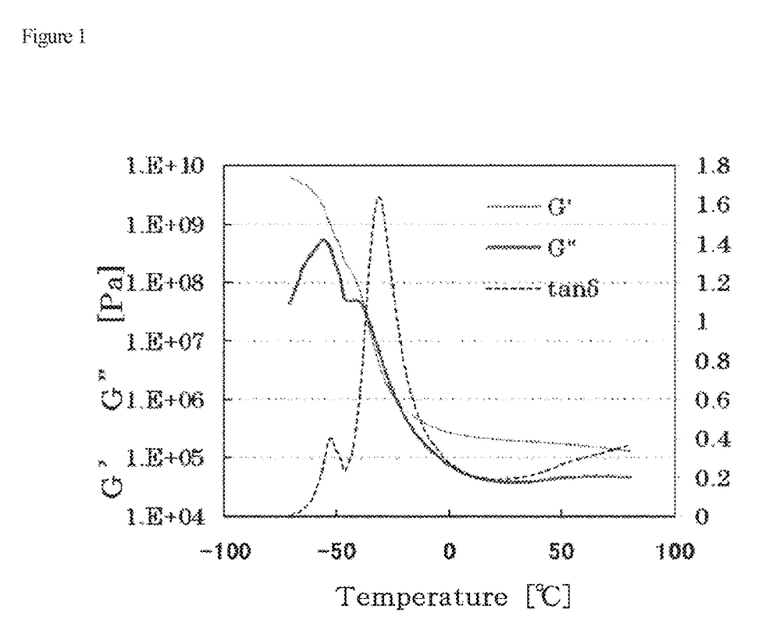
FIG. 1 shows a graph indicating the evaluation results on the miscibility of the (meth)acrylic polymer and the rubber component used in Example 2.

In a PSA formed of the water-dispersed PSA composition according to the present invention, the (meth)acrylic polymer and the rubber component exist in immiscible phases. The miscibility of the (meth)acrylic polymer component and the rubber component can be evaluated by the peaks of the (meth) acrylic polymer component and the peaks of the rubber component in the loss modulus curve and the loss tangent curve obtained by a dynamic viscoelastic measurement. More specifically, for instance, as shown in FIG. 1, when two peaks are present corresponding to a peak of a (meth)acrylic polymer and a peak of a rubber component in the loss modulus (G") curve or in the loss tangent (tan δ) curve obtained by a dynamic viscoelastic measurement, it indicates that the (meth)acrylic polymer component and the rubber component are immiscible with each other.

Figure 2:
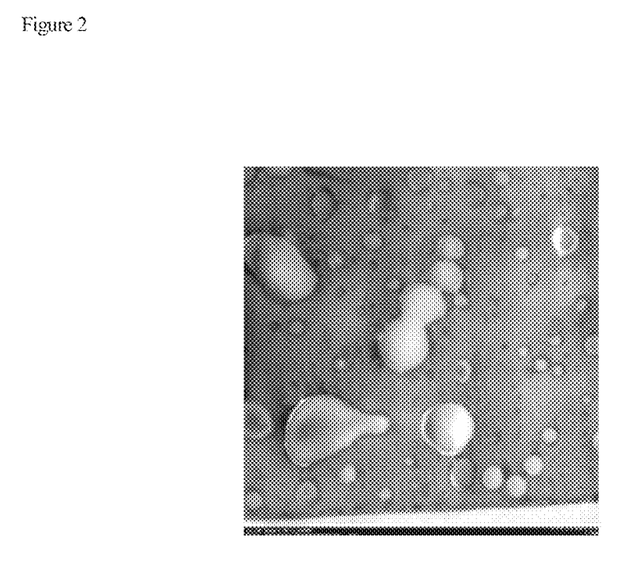
FIG. 2 shows a TEM image of the PSA sheet obtained in Example 2.

It is noted that when the rubber component of the rubber-based latex and the (meth)acrylic polymer are present in immiscible phases, in a dried PSA, the acrylic phase formed primarily of the (meth)acrylic polymer and the rubber phase formed primarily of the rubber component form a sea-island structure. Such a structure can be visually confirmed, for instance, as shown in FIG. 2, by observing a section of dried PSA with a transmission electron microscope (TEM).

Hence, when the (meth)acrylic polymer peak and the rubber component peak overlap with each other in the loss modulus curve and the loss tangent curve obtained by a dynamic viscoelastic measurement, the miscibility can be evaluated by determining whether a sea-island structure has been formed or not. For this case, in the present invention, as long as a sea-island structure is formed to some extent, even if there is a miscible region, it is judged to be immiscible.

The ratio of such a (meth)acrylic polymer to the rubber-based latex ((meth)acrylic polymer/rubber-based latex) is preferably 95/5 to 25/75 or more preferably 90/10 to 30/70 based on their solid contents. When the amount of the rubber component is smaller than the aforementioned range, the adhesive strength to a non-polar adherend and the adhesive strength at a low temperature will decrease. When the amount of the acrylic polymer component is smaller than the aforementioned range, sufficient adhesive strength to a polar adherend such as SUS, etc., may not be obtained.

(iii) Tackifier

The water-dispersed PSA composition according to the present invention comprises a tackifier (typically a tackifying resin) that is miscible with the rubber component, but immiscible with the (meth)acrylic polymer.

Examples of such a tackifier include tackifying resins, with examples including rosin-based resins such as rosin esters, hydrogenated rosin esters, disproportionated rosin esters, polymerized rosin esters, etc.; coumarone-indene-based resins such as coumarone-indene resins, hydrogenated coumarone-indene resins, phenol-modified coumarone-indene resins, epoxy-modified coumarone-indene resins, etc.; terpene-based resins such as α-pinene resins, β-pinene resins, polyterpene resins, hydrogenated terpene resins, aromatic modified terpene resins, terpene phenolic resins, etc.; petroleum-based resins such as aliphatic petroleum resins, aromatic petroleum resins, aromatic modified aliphatic petroleum resins, etc.; and so on. These can be used singly or in combination of two or more kinds. Particularly preferable are rosin-based resins, terpene-based resins, and coumarone-indene resins.

The tackifier is miscible with the rubber component, but immiscible with the (meth)acrylic polymer. Thus, it is considered that with the tackifier being miscible with the rubber component, the modulus of elasticity of the rubber phase decreases, and as a result, with the increasing wettability to an adherend allows the adhesive strength to increase.

The miscibility of a tackifier can be evaluated by the presence of haze in a PSA sheet after dried. More specifically, it is evaluated based on the methods for "(2) Evaluation of the miscibility of rubber component and tackifier" and "(3) Evaluation of the miscibility of (meth)acrylic polymer and tackifier" in Examples described later.

The amount of the rubber-component-miscible tackifier to be added is, for instance, 5 to 100 parts by weight or preferably 10 to 90 parts by weight relative to 100 parts by weight of solid contents of the rubber-based latex. When this amount is below this range, the modulus of elasticity of the rubber phase will not be sufficiently reduced and sufficient wettability to an adherend may not be obtained. When this amount is above this range, the glass transition temperature of the rubber phase increases and the modulus of elasticity at a low temperature increases, whereby, at a low temperature, sufficient wettability to an adherend cannot be obtained and the adhesive strength decreases.

The rubber-component-miscible tackifier has a softening point of preferably 80° C. to 150° C. or more preferably 90° C. to 140° C. When it is below this range, the cohesive strength of the PSA decreases. When it is above this range, the low temperature adhesive strength is likely to decrease.

It is noted that the softening point of a tackifying resin can be measured based on, for instance, the ring-and-ball method (JIS K-5902).

Although the mode of addition of a tackifying resin is not particularly limited, it is usually preferable that the tackifying resin is added in a water dispersion form where it is pre-dispersed in water. As such a water dispersion of a tackifying resin, a commercial product can be used. Alternatively, can be used a desired tackifier forced to disperse in water by a disperser.

In the water-dispersed PSA composition according to the present invention, in addition to the tackifier miscible with the rubber component, may be used a tackifier (typically a tackifying resin) miscible with the (meth)acrylic polymer. By using such a tackifier in combination, can be produced an effect of further increasing the adhesive strength at room temperature.

Examples of such a tackifying resin miscible with the (meth)acrylic polymer include rosin-based resins such as rosin esters, hydrogenated rosin esters, disproportionated rosin esters, polymerized rosin esters, etc.; coumarone-indene-based resins such as coumarone-indene resins, hydrogenated coumarone-indene resins, phenol-modified coumarone-indene resins, epoxy-modified coumarone-indene resins, etc.; terpene-based resins such as α-pinene resins, β-pinene resins, polyterpene resins, hydrogenated terpene resins, aromatic modified terpene resins, terpene phenolic resins, etc.; petroleum-based resins such as aliphatic petroleum resins, aromatic petroleum resins, aromatic modified aliphatic petroleum resins, etc.; and so on. Rosin ester-based resins are particularly preferable. These can be used singly or in combination of two or more kinds.

It is noted that as the tackifying resins of terpene-based, rosin-based, etc., various tackifying resins having a wide range of sp values are available (e.g., see "Handbook of Pressure-Sensitive Adhesive (3rd ed.)" (published by Japan Adhesive Tape Manufacturers Association)). A person of ordinary skill in the art may figure out how to obtain a tackifying resin that is miscible with the rubber component, but immiscible with the (meth)acrylic polymer based on the contents of description of the present application including the specific examples described later as well as general technical knowledge such as sp values, etc.

The amount of the (meth)acrylic-polymer-miscible tackifying resin to be added is, for instance, within a range greater than 0 part by weight up to 20 parts by weight or preferably 1 to 10 parts by weight relative to 100 parts by weight of solid contents of the (meth)acrylic polymer. When it is above this range, the glass transition temperature of the acrylic phase formed primarily of the (meth)acrylic polymer increases and the modulus of elasticity at a low temperature increases, whereby, at a low temperature, sufficient wettability to an adherend may not be obtained, causing the adhesive strength to decrease.

In the water-dispersed PSA composition according to the present invention, in addition to the aforementioned tackifiers, may be used a tackifying resin in a liquid state at room temperature.

Although the mode of addition of a tackifying resin in a liquid state at room temperature is not particularly limited, the tackifying resin in a liquid state at room temperature is preferably added as a dispersion where it has been pre-dispersed in water. As a water dispersion of such a liquid-at-room-temperature tackifying resin, a commercial product can be used. Alternatively, can be used a desired tackifying resin forced to disperse in water by a disperser. Tackifying resin in a liquid state at mom temperature refers to a tackifying resin having a softening point of 25° C. or below before dispersed as an emulsion. In the present invention, of these resins, low molecular weight polymers of rosin esters and/or terpene are particularly preferable.

The tackifying resin in a liquid state at room temperature is preferably miscible with the rubber component. With the tackifying resin in a liquid state at room temperature being miscible with the rubber component, the modulus of elasticity of the rubber phase decreases and the wettability to an adherend increases, allowing the adhesive strength to increase.

The amount of the liquid-at-room-temperature tackifying resin to be added is, for instance, within a range greater than 0 part by weight up to 50 parts by weight or preferably 1 to 40 parts by weight relative to 100 parts by weight of solid contents of the rubber based latex. When it is above this range, the cohesive strength of the PSA decreases.

(iv) Other Components

To the water-dispersed PSA composition according to the present invention, in accordance with its purpose and application, as necessary, a crosslinking agent can be added. Examples of the crosslinking agent include isocyanate-based crosslinking agents, epoxy-based crosslinking agents, oxazoline-based crosslinking agents, aziridine-based crosslinking agents, metal chelate-based crosslinking agents, and so on.

These crosslinking agents are not particularly limited, and an oil-soluble or a water-soluble crosslinking agent can be used. These crosslinking agents can be used singly or in combination, as appropriate. Its amount to be added is, for instance, 10 parts by weight or smaller, preferably 0.01 to 10 parts by weight, or more preferably 0.02 to 5 parts by weight relative to 100 parts by weight of the (meth)acrylic polymer.

Examples of an isocyanate-based crosslinking agent include lower aliphatic polyisocyanates such as 1,2-ethylene diisocyanate, 1,4-butylene diisocyanate, 1,6-hexamethylene diisocyanate, etc.; alicyclic polyisocyanates such as cyclopentylene diisocyanate, cyclohexylene diisocyanate, isophorone diisocyanate, hydrogenated tolylene diisocyanate, hydrogenated xylene diisocyanate, etc.; and aromatic polyisocyanates such as 2,4-tolylene diisocyanate, 2,6-tolylene diisocyanate, 4,4'-diphenylmethane diisocyanate, xylylene diisocyanate, etc.; and so on. As the isocyanate-based crosslinking agent, for example, can also be used commercial products including an adduct of trimethylolpropane and tolylene diisocyanate (trade name "CORONATE L" available from Nippon Polyurethane Industry Co., Ltd.), an adduct of trimethylolpropane and hexamethylene diisocyanate (trade name "CORONATE HL" available from Nippon Polyurethane Industry Co., Ltd.), an adduct of trimethylolpropane and xylylene diisocyanate (trade name "TAKENATE D-110N" available from Mitsui Chemicals, Inc.), and so on.

Examples of an epoxy-based crosslinking agent include N,N,N',N'-tetraglycidyl-m-xylenediamine, diglycidylaniline, 1,3-bis(N,N-diglycidylaminomethyl)cyclohexane, 1,6-hexanediol diglycidyl ether, neopentyl glycol diglycidyl ether, ethylene glycol diglycidyl ether, propylene glycol diglycidyl ether, polyethylene glycol diglycidyl ethers, polypropylene glycol diglycidyl ethers, sorbitol polyglycidyl ethers, glycerol polyglycidyl ethers, pentaerythritol polyglycidyl ethers, polyglycerol polyglycidyl ethers, sorbitan polyglycidyl ethers, trimethylolpropane polyglycidyl ethers, diglycidyl adipate, o-diglycidyl phthalate, triglycidyl tris(2-hydroxyethyl)isocyanurate, resorcinol diglycidyl ether and bisphenol-S diglycidyl ether; as well as epoxy-based resins having two or more epoxy groups per molecule. As the epoxy-based crosslinking agent, can also be used, for example, commercial products such as trade name "TETRAD C" available from Mitsubishi Gas Chemical Company, Inc., and so on.

Examples of an oxazoline-based crosslinking agent include those listed as examples in Japanese Patent Application Publication No. 2009-001673. In particular, it can be a compound having a main chain of an acryl structure or a styrene structure as well as an oxazoline group as a side chain of the main chain, or preferably an oxazoline-group-containing acrylic polymer having a main chain of an acryl structure and an oxazoline group as a side chain of the main chain.

Examples of an aziridine-based crosslinking agent include trimethylolpropane tris[3-(1-azyridinyl)propionate] and trimethylolpropane tris[3-(1-(2-methyl)azyridinyl propionate].

Examples of a metal chelate-based crosslinking agent include those listed in Japanese Patent Application Publication No. 2007-063536. In particular, examples include aluminum chelate-based compounds, titanium chelate-based compounds, zinc chelate-based compounds, zirconium chelate-based compounds, iron chelate-based compounds, cobalt chelate-based compounds, nickel chelate-based compounds, tin chelate-based compounds, manganese chelate-based compounds, and chromium chelate-based compounds.

To the water-dispersed PSA composition according to the present invention, as necessary, can be added additives usually added to PSA such as thickeners, release adjusting agents, plasticizers, softening agents, fillers, colorants (pigments, dyes, etc.), anti-aging agents, surfactants, leveling agents, anti-foaming agents, and so on. The amounts of these additives to be added are not particularly limited and can be suitably selected.

The thickener can be an acrylic alkaline thickening type, a urethane-based associative type, a clay-based one, a cellulose-based one, a polyamide-based one, and so on. For example, it can be added in an amount of 0.01 to 1% by weight of the water-dispersed PSA composition. By using a thickener within such a range, the water-dispersed PSA composition can be adjusted to have applicable viscosity and a PSA sheet free of air spots and grooves can be obtained.

The water-dispersed PSA composition according to the present invention has a storage modulus of preferably 1 MPa or smaller over a range of 15° C. to 25° C., or more preferably 0.9 MPa or smaller, when determined by a dynamic viscoelastic measurement in which shear strain is applied at a frequency of 1 Hz after a PSA is formed. When it is above this range, the wettability to an adherend turns out insufficient and the adhesive strength decreases. Although the lower limit is not particularly limited, it can be, for instance, 0.01 MPa or greater.

With respect to the water-dispersed PSA composition according to the present invention, although the solvent-insoluble portion (gel fraction) of a produced PSA is not particularly limited, it is preferably 70% by weight or smaller, more preferably 0.5 to 50% by weight, or even more preferably 1 to 40% by weight.

(II) PSA Sheet

The PSA sheet according to the present invention comprises a PSA layer formed of the water-dispersed PSA composition described above.

The PSA sheet according to the present invention may have a configuration of an on-substrate PSA sheet where such a PSA layer is provided on either face or each face of a substrate (support) sheet, or it may have a configuration of a substrate-free PSA sheet where the PSA layer is held on a release sheet (which may be a substrate sheet having a release surface). The concept of the PSA sheet referred to here encompasses those called as PSA tapes, PSA labels, PSA films, and so on.

Although the PSA layer is typically formed in a continuous manner, it is not limited to such a form and it can be formed into, for example, a regular or random pattern of dots, stripes, and so on. The PSA sheet provided by the present invention may be in a roll or in a flat sheet. Alternatively, the PSA sheet can be processed into various other forms.

Figure 3:
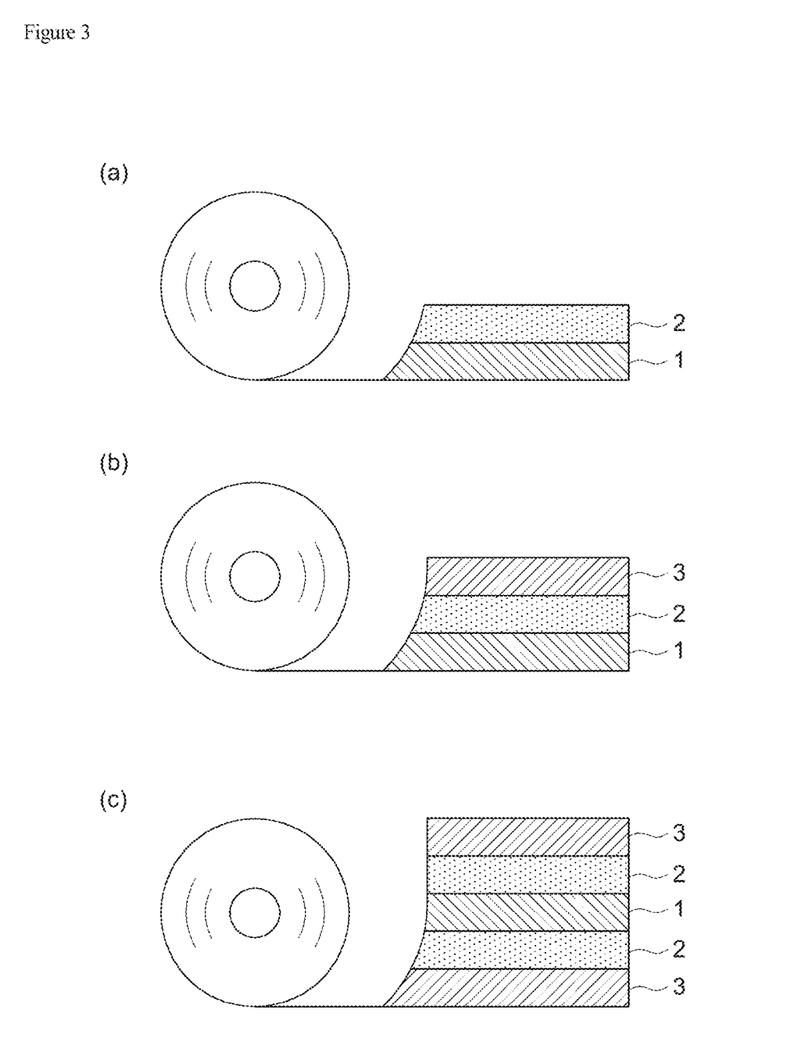
FIG. 3 shows cross-sectional diagrams schematically illustrating outline configurations of PSA sheets according to some embodiments of the present invention.

The PSA sheet according to the present invention can be made to have the respective cross-sectional structures schematically illustrated in FIG. 3(a)-(c).

FIG. 3(a) shows a configuration example of an on-substrate PSA sheet of an adhesively single-faced kind, in which PSA layer 2 is provided on one face of substrate 1. For example, such a PSA sheet can be made into a roll by winding it so that, with substrate 1 having a release surface on its face opposite to the face having PSA layer 2, as shown in FIG. 3(a), the release surface of substrate 1 laminated with PSA layer 2 comes in contact with PSA layer 2 laminated on substrate 1.

The PSA sheet shown in FIG. 3(b) has a configuration where PSA layer 2 is protected with release sheet 3 having a release surface at least on the PSA layer side and it can also be made into a roll by winding it.

The PSA sheet shown in FIG. 3(c) has a configuration where PSA layer 2 is provided on each face of substrate 1 and each of these PSA layers 2 is protected with release sheet 3 having a release surface at least on the PSA layer side. The PSA sheet shown in FIG. 3(c) can be made into a roll, for instance, by pre-forming PSA layer 2 on release sheet 3 and adhering this to each of the front and back faces of substrate 1, and winding the resultant.

In the PSA sheet shown in FIG. 3(c), PSA layer 2 is provided on each face of substrate 1. These PSA layers 2 may be formed of a PSA having the same composition or may be formed respectively of PSA's having different compositions.

Examples of a material forming the substrate include polyolefin-based films such as polyethylenes, polypropylenes, ethylene-propylene copolymers, etc.; polyester-based films such as polyethylene phthalate, etc.; plastic films such as polyvinyl chloride, etc.; papers such as Kraft papers, Washi papers, etc.; fabrics such as cotton fabrics, staple cloth fabrics, etc.; non-woven fabrics such as polyester non-woven fabrics, vinylon non-woven fabrics, etc.; and metal foils.

The plastic films may be non-stretched films, or stretched (uni-axially stretched or bi-axially stretched) films. To the substrate surface to be provided with a PSA layer, can be given a surface treatment such as primer coating, corona discharge treatment, and so on.

The PSA layer can be obtained by applying the water-dispersed PSA composition described above to a substrate by a known coating method followed by drying. The method for applying the water-dispersed PSA composition to a substrate is not particularly limited and it can be carried out using, for instance, a gravure roll coater, a reverse roll coater, a kiss roll coater, a dip roll coater, a bar coater, a knife coater, a spray coater, a fountain dye coater, a closed edge dye coater, and so on.

The PSA layer can be formed by transferring to a substrate a PSA layer pre-formed by applying the water-dispersed PSA composition to a release sheet.

The thickness of the PSA layer after dried is not particularly limited, and it is, for instance, 500 μm or smaller, or preferably within a range of 5 μm to 200 μm. Although the drying temperature may depend on the kind of the substrate, it can be, for instance, within a range of 40° C. to 120° C.

From the standpoint of providing a PSA sheet that exhibits good adhesiveness to a non-polar adherend and maintains its properties even at a low temperature, the PSA sheet according to the present invention has preferably an adhesive strength to a PP plate at 25° C. of 5.0 N/20 mm or greater and an adhesive strength to a PP plate at −5° C. of 4.0 N/20 mm greater, more preferably an adhesive strength to a PP plate at 25° C. of 5.5 N/20 mm or greater and an adhesive strength to a PP plate at −5° C. of 4.5 N/20 mm or greater, or even more preferably an adhesive strength to a PP plate at 25° C. of 6.0 N/20 mm or greater and an adhesive strength to a PP plate at −5° C. of 5.0 N/20 mm or greater.

From the standpoint of providing a PSA sheet that exhibits good adhesiveness to a polar adherend and maintains its properties even at a low temperature, it has preferably an adhesive strength to a SUS plate at 25° C. of 4.5 N/20 mm or greater and an adhesive strength to a SUS plate at −5° C. of 6.0 N/20 mm or greater, more preferably an adhesive strength to a SUS plate at 25° C. of 5.0 N/20 mm or greater and an adhesive strength to a SUS at −5° C. plate of 6.5 N/20 mm or greater, or even more preferably an adhesive strength to a SUS plate at 25° C. of 5.5 N/20 mm or greater and an adhesive strength to a SUS plate at −5° C. of 7.0 N/20 mm or greater.

EXAMPLES

The present invention is described more specifically with examples and comparative examples below. However, the present invention is not limited to the following examples and comparative examples. In the following descriptions, "part" and "%" are based on the weight unless otherwise specified.

Synthesis Example 1

Synthesis of a Water-Dispersed (Meth)Acrylic Polymer (A)

To a reaction vessel equipped with a condenser, a nitrogen inlet tube, a thermometer and a stirrer, were added 96 parts of butyl acrylate (BA), 4 parts of acrylic acid (AA), 0.08 part of t-dodecanethiol (chain transfer agent), 2 parts of sodium polyoxyethylene lauryl sulfate (emulsifier) and 153 parts of ion-exchanged water as an emulsified mixture (i.e., an emulsion of starting monomers); and the resulting mixture was stirred under nitrogen gas for one hour.

Then, it was heated to 60° C., and to this, was added, based on solid contents, 0.1 part of 2,2'-azobis[N-(2-carboxyethyl)-2-methylpropionamidine]hydrate (polymerization initiator) (trade name "VA-057" available from Wako Pure Chemical Industries, Ltd.) prepared as a 10% aqueous solution, and the polymerization was carried out for 3 hours. To this, was added 10% aqueous ammonia to adjust it to pH 7.5 and was obtained a water-dispersed (meth)acrylic polymer (A).

Synthesis Example 2

Synthesis of a Water-Dispersed (Meth)Acrylic Polymer (B)

In the same manner as Synthesis Example 1 except that 2-ethylhexyl acrylate (2-EHA) was used in place of butyl acrylate (BA), was obtained a water-dispersed (meth)acrylic polymer (B).

Example 1

Both based on solid contents, were mixed 70 parts of the water-dispersed (meth)acrylic polymer (A) obtained in Synthesis Example 1 and 30 parts of a synthetic polyisoprene latex (trade name "SEPOLEX IR-100K" available from Sumitomo Seika Chemicals Co., Ltd.). To this, based on solid contents, was added, as a tackifier, 12 parts (40 parts relative to 100 parts of solid contents of the rubber latex) of an aromatic modified terpene resin emulsion (trade name "NANO-LET R-1050" available from Yasuhara Chemical Co., Ltd., softening point 100° C.) to prepare a water-dispersed PSA composition.

Then, the resulting water-dispersed PSA composition was mixed with 0.5 part of an acrylic alkali thickening agent (trade name "ARON B-500" available from Toagosei Co., Ltd.) to increase the viscosity and the thickened water-dispersed PSA composition was applied to coat a 25 μm thick polyethylene phthalate substrate (trade name "LUMIRROR S-10" available from Toray Industries, Inc.) so as to obtain a thickness of 60 μm after dried and this was allowed to dry at 100° C. for 3 minutes to prepare a PSA sheet.

Example 2

A PSA sheet was prepared in the same manner as Example 1 except that the amount of the tackifier was 6 parts (20 parts relative to 100 parts of solid contents of the rubber latex) instead of 12 parts. FIG. 2 shows a TEM image of the resulting PSA sheet.

Example 3

A PSA sheet was prepared in the same manner as Example 1 except that the amount of the tackifier was 18 parts (60 parts relative to 100 parts of solid contents of the rubber latex) instead of 12 parts and 0.04 part of an epoxy-based crosslinking agent (trade name "TETRAD-C" available from Mitsubishi Gas Chemical Company, Inc.) was further added to prepare the water-dispersed PSA composition.

Example 4

A PSA sheet was prepared in the same manner as Example 1 except that the amount of the tackifier was 24 parts (80 parts relative to 100 parts of solid contents of the rubber latex) instead of 12 parts.

Example 5

A PSA sheet was prepared in the same manner as Example 1 except that 0.04 part of an epoxy-based crosslinking agent (trade name "TETRAD-C" available from Mitsubishi Gas Chemical Company, Inc.) was further added to prepare the water-dispersed PSA composition.

Example 6

Both based on solid contents, were mixed 90 parts of the water-dispersed (meth)acrylic polymer (A) obtained in Synthesis Example 1 and 10 parts of a synthetic polyisoprene latex (trade name "SEPOLEX IR-100K" available from Sumitomo Seika Chemicals Co., Ltd.). To this, based on solid contents, was added 4 parts (40 parts relative to 100 parts of solid contents of the rubber latex) of a tackifier (trade name "NANOLET R-1050" available from Yasuhara Chemical Co., Ltd., softening point 100° C.) to prepare a water-dispersed PSA composition.

Then, the resulting water-dispersed PSA composition was mixed with 0.5 part of an acrylic alkali thickener (trade name "ARON B-500" available from Toagosei Co., Ltd.) to increase the viscosity and the thickened water-dispersed PSA composition was applied to coat a 25 μm thick polyethylene phthalate substrate (trade name "LUMIRROR S-10" available from Toray Industries, Inc.) so as to obtain a thickness of 60 μm after dried and this was allowed to dry at 100° C. for 3 minutes to prepare a PSA sheet.

Example 7

Both based on solid contents, were mixed 50 parts of the water-dispersed (meth)acrylic polymer (A) obtained in Synthesis Example 1 and 50 parts of a synthetic polyisoprene latex (trade name "SEPOLEX IR-100K" available from Sumitomo Seika Chemicals Co., Ltd.). To this, based on solid contents, were added 30 parts (60 parts relative to 100 parts of solid contents of the rubber latex) of a tackifier (trade name "NANOLET R-1050" available from Yasuhara Chemical Co., Ltd., softening point 100° C.) and 0.04 part of an epoxy-based crosslinking agent (trade name "TETRAD-C" available from Mitsubishi Gas Chemical Company, Inc.) to prepare a water-dispersed PSA composition.

Then, the resulting water-dispersed PSA composition was mixed with 0.5 part of an acrylic alkali thickener (trade name "ARON B-500" available from Toagosei Co., Ltd.) to increase the viscosity and the thickened water-dispersed PSA composition was applied to coat a 25 μm thick polyethylene phthalate substrate (trade name "LUMIRROR S-10" available from Toray Industries, Inc.) so as to obtain a thickness of 60 μm after dried and this was allowed to dry at 100° C. for 3 minutes to prepare a PSA sheet.

Example 8

A PSA sheet was prepared in the same manner as Example 7 except that the amount of the tackifier was 40 parts (80 parts relative to 100 parts of solid contents of the rubber latex) instead of 30 parts and no crosslinking agent was added.

Example 9

Both based on solid contents, were mixed 30 parts of the water-dispersed (meth)acrylic polymer (A) obtained in Synthesis Example 1 and 70 parts of a synthetic polyisoprene latex (trade name "SEPOLEX IR-100K" available from Sumitomo Seika Chemicals Co., Ltd.). To this, based on solid contents, was added 56 parts (80 parts relative to 100 parts of solid contents of the rubber latex) of a tackifier (trade name "NANOLET R-1050" available from Yasuhara Chemical Co., Ltd., softening point 100° C.) to prepare a water-dispersed PSA composition. Then, the resulting water-dispersed PSA composition was mixed with 0.5 part of an acrylic alkali thickener (trade name "ARON B-500" available from Toagosei Co., Ltd.) to increase the viscosity and the thickened water-dispersed PSA composition was applied to coat a 25 μm thick polyethylene phthalate substrate (trade name "LUMIRROR S-10" available from Toray Industries, Inc.) so as to obtain a thickness of 60 μm after dried and this was allowed to dry at 100° C. for 3 minutes to prepare a PSA sheet.

Example 10

A PSA sheet was prepared in the same manner as Example 1 except that a styrene-butadiene latex (trade name "SB-0561" available from JSR Corporation) was added in place of the synthetic polyisoprene latex (trade name "SEPOLEX IR-100K" available from Sumitomo Seika Chemicals Co., Ltd.).

Example 11

A PSA sheet was prepared in the same manner as Example 1 except that a styrene-butadiene latex (trade name "SB-2877A" available from JSR Corporation) was added in place of the synthetic polyisoprene latex (trade name "SEPOLEX IR-100K" available from Sumitomo Seika Chemicals Co., Ltd.).

Example 12

A PSA sheet was prepared in the same manner as Example 1 except that, based on solid contents, 3.5 parts (12 parts relative to 100 parts of solid contents of the rubber latex) of a rosin-based tackifier (trade name "SUPER ESTER NS-100H" available from Arakawa Chemical Industries, Ltd., softening point 100° C.) was further added to prepare the water-dispersed PSA composition.

Example 13

A PSA sheet was prepared in the same manner as Example 1 except that the water-dispersed (meth)acrylic polymer (B) obtained in Synthesis Example 2 was used in place of the water-dispersed (meth)acrylic polymer (A) obtained in Synthesis Example 1 and 0.06 part of an epoxy-based crosslinking agent (trade name "TETRAD-C" available from Mitsubishi Gas Chemical Company, Inc.) was further added.

Example 14

Both based on solid contents, were mixed 70 parts of the water-dispersed (meth)acrylic polymer (A) obtained in Synthesis Example 1 and 30 parts of an acrylonitrile butadiene latex (trade name "NIPOL LX-513" available from Zeon Corporation, Tg: −31° C.). To this, based on solid contents, was added 18 parts (60 parts relative to 100 parts of solid contents of the rubber latex) of a tackifier (trade name "NANOLET R-1050" available from Yasuhara Chemical Co., Ltd., softening point 100° C.) to prepare a water-dispersed PSA composition. Then, the resulting water-dispersed PSA composition was mixed with 0.5 part of an acrylic alkali thickener (trade name "ARON B-500" available from Toagosei Co., Ltd.) to increase the viscosity and the thickened water-dispersed PSA composition was applied to coat a 25 μm thick polyethylene phthalate substrate (trade name "LUMIRROR S-10" available from Toray Industries, Inc.) so as to obtain a thickness of 60 μm after dried and this was allowed to dry at 100° C. for 3 minutes to prepare a PSA sheet.

Comparative Example 1

The water-dispersed (meth)acrylic polymer (A) obtained in Synthesis Example 1 was mixed with 0.5 part of an acrylic alkali thickener (trade name "ARON B-500" available from Toagosei Co., Ltd.) to increase the viscosity and the thickened water-dispersed PSA composition was applied to coat a 25 μm thick polyethylene phthalate substrate (trade name "LUMIRROR S-10" available from Toray Industries, Inc.) so as to obtain a thickness of 60 μm after dried and this was allowed to dry at 100° C. for 3 minutes to prepare a PSA sheet.

Comparative Example 2

A PSA sheet was prepared in the same manner as Comparative Example 1 except that, based on solid contents, 20 parts of a rosin-based tackifier (trade name "SUPER ESTER NS-100H" available from Arakawa Chemical Industries, Ltd., softening point 100° C.) was further added to prepare the water-dispersed PSA composition.

Comparative Example 3

A PSA sheet was prepared in the same manner as Example 6 except that the tackifier (trade name "NANOLET R-1050" available from Yasuhara Chemical Co., Ltd., softening point 100° C.) was not added.

Comparative Example 4

A PSA sheet was prepared in the same manner as Example 1 except that the tackifier (trade name "NANOLET R-1050" available from Yasuhara Chemical Co., Ltd., softening point 100° C.) was not added.

Comparative Example 5

A PSA sheet was prepared in the same manner as Example 6 except that 18 parts (180 parts relative to 100 parts of solid contents of the rubber latex) of a rosin-based tackifier (trade name "SUPER ESTER NS-100H" available from Arakawa Chemical Industries, Ltd., softening point 100° C.) was added in place of the tackifier (trade name "NANOLET R-1050" available from Yasuhara Chemical Co., Ltd., softening point 100° C.).

Comparative Example 6

A PSA sheet was prepared in the same manner as Example 1 except that a styrene-butadiene latex (trade name "SB-0589" available from JSR Corporation) was added in place of the synthetic polyisoprene latex (trade name "SEPOLEX IR-100K" available from Sumitomo Seika Chemicals Co., Ltd.).

Comparative Example 7

A PSA sheet was prepared in the same manner as Example 1 except that a styrene-butadiene latex (trade name "SB-0533" available from JSR Corporation) was added in place of the synthetic polyisoprene latex (trade name "SEPOLEX IR-100K" available from Sumitomo Seika Chemicals Co., Ltd.).

Comparative Example 8

A PSA sheet was prepared in the same manner as Example 1 except that a styrene-butadiene latex (trade name "SB-0568" available from JSR Corporation) was added in place of the synthetic polyisoprene latex (trade name "SEPOLEX IR-100K" available from Sumitomo Seika Chemicals Co., Ltd.).

Comparative Example 9

A PSA sheet was prepared in the same manner as Example 1 except that a MMA-grafted natural rubber latex (trade name "REGITEX MG-25" available from Regitex Corporation) was added in place of the synthetic polyisoprene latex (trade name "SEPOLEX IR-100K" available from Sumitomo Seika Chemicals Co., Ltd.) and, based on solid contents, 14 parts (47 parts relative to 100 parts of solid contents of the rubber latex) of a rosin-based tackifier (trade name "SUPER ESTER NS-100H" available from Arakawa Chemical Industries, Ltd., softening point 100° C.) was added in place of the tackifier (trade name "NANOLET R-1050" available from Yasuhara Chemical Co., Ltd., softening point 100° C.).

<EVALUATIONS>

(1) Evaluation of the Miscibility of (Meth)Acrylic Polymer and Rubber Component

Both based on solid contents, were mixed 70 parts of a water-dispersed (meth)acrylic polymer and 30 parts of a latex to prepare a water-dispersed PSA composition.

Then, the resulting water-dispersed PSA composition was mixed with 0.5 part of an acrylic alkali thickener (trade name "ARON B-500" available from Toagosei Co., Ltd.) to increase the viscosity and the thickened water-dispersed PSA composition was applied to coat a release sheet (trade name "DIAFOIL MRF-38" available from Mitsubishi Plastics, Inc.) so as to obtain a thickness of 60 μm after dried and this was allowed to dry at 100° C. for 3 minutes to prepare a PSA sheet.

The PSA sheet was released from the release sheet and a few PSA layers were laminated to prepare a laminate of about 2 mm thick and from this, a 7.9 mm diameter measurement sample was cut out. The measurement sample was placed between 7.9 mm diameter parallel discs, and using a dynamic viscoelastic measurement device ("Advanced Rheometric Expansion System" available from Rheometric Scientific, Inc.), while applying shear strain at a frequency of 1 Hz, at a heating rate of 5° C./min, were measured the storage modulus (G') and the loss modulus (G") over a range of −70° C. to 100° C. Based on the storage modulus (G') and the loss modulus (G"), the loss tangent tan δ was calculated by the following equation:

$$\text{Loss tangent tan } \delta = G''/G'$$

The calculated loss tangent (tan δ) values were plotted against the temperature to obtain a loss tangent curve and the presence of a (meth)acrylic polymer peak and a rubber component peak were checked. When the two peaks were not present, it was determined to be miscible (M) and when both of the peaks were present, it was determined to be immiscible (IM). Table 1 shows the results of the evaluation of the miscibilities of the (meth)acrylic polymers and the rubber components used in Examples and Comparative Examples described above.

In addition, as an example, FIG. 1 shows a graph exhibiting the results of the evaluation on the miscibility of the (meth) acrylic polymer and the rubber component used in Example 2.

TABLE 1

| Trade name | Water-dispersed (meth)acrylic polymer | |
|---|---|---|
| | A | B |
| IR-100K | IM | IM |
| SB-0561 | IM | — |
| SB-0589 | IM | — |
| SB-0533 | IM | — |
| SB-0568 | IM | — |
| SB-2877A | IM | — |
| MG-25 | IM | — |
| LX-513 | IM | — |

(2) Evaluation of the Miscibility of Rubber Component and Tackifier

To 100 parts of solid contents of the latex, was added, based on solid contents, 20 parts of the tackifier to prepare a water-dispersed PSA composition. Then, the resulting water-dispersed PSA composition was mixed with 0.5 part of an acrylic alkali thickener (trade name "ARON B-500" available from Toagosei Co., Ltd.) to increase the viscosity and the thickened water-dispersed PSA composition was applied to coat a release sheet (trade name "DIAFOIL MRF-38" available from Mitsubishi Plastics, Inc.) so as to obtain a thickness of 60 μm after dried and this was allowed to dry at 100° C. for 3 minutes to prepare a PSA sheet.

To one face of the prepared PSA sheet, was adhered a glass slide ("Glass Slide White Ground Edges" available from Matsunami Glass Ind., Ltd.; 1.3 min thick), and from this, the release sheet was removed to prepare a sample for evaluation.

The haze of this sample was measured with a haze meter "HM-150" (available from Murakami Color Research Laboratory Co., Ltd.), and in accordance with JIS K7136, the value was calculated by the equation: haze (%)=Td/Tt×100 (Td: diffuse transmittance, Tt: total transmittance). When the calculated haze value was 50% or smaller (0 to 50%), it was determined to be miscible and when it was greater than 50%, it was determined to be immiscible.

It is noted that regarding the evaluation of the miscibility, with respect to the prepared PSA sheet, it is preferable to determine it to be miscible when its haze value is 45% or smaller and immiscible when it is greater than 45%, or it is more preferable to determine it to be miscible when its haze value is 40% or smaller and immiscible when its greater than 40%.

Table 2 shows the evaluation results of the haze values with respect to the pairs of the rubber component and the tackifier used in Examples and Comparative Examples described above.

TABLE 2

| | Haze value (%) Tackifying resin | |
|---|---|---|
| Trade name | R-1050 | NS-100H |
| IR-100K | 4.6 | 70.3 |
| SB-0561 | 39.2 | — |
| SB-0589 | 2.2 | — |
| SB-0533 | 1.0 | — |
| SB-0568 | 1.8 | — |
| SB-2877A | 17.1 | — |
| MG-25 | 5.5 | — |
| LX-513 | 17.5 | — |

(3) Evaluation of the Miscibility of (Meth)Acrylic Polymer and Tackifier

To 100 parts of solid contents of the (meth)acrylic polymer, was added, based on solid contents, 20 parts of the tackifier to prepare a water-dispersed PSA composition. Then, the resulting water-dispersed PSA composition was mixed with 0.5 part of an acrylic alkali thickener (trade name "ARON B-500" available from Toagosei Co., Ltd.) to increase the viscosity and the thickened water-dispersed PSA composition was applied to coat a release sheet (trade name "DIAFOIL MRF-38" available from Mitsubishi Plastics, Inc.) so as to obtain a thickness of 60 μm after dried and this was allowed to dry at 100° C. for 3 minutes to prepare a PSA sheet.

To one face of the prepared PSA sheet, was adhered a glass slide ("Glass Slide White Ground Edges" available from Matsunami Glass Ind., Ltd.; 1.3 mm thick), and from this, the release sheet was removed to prepare a sample for evaluation. The haze of this sample was measured with a haze meter "HM-150" (available from Murakami Color Research Laboratory Co., Ltd.), and in accordance with JIS K7136, the value was calculated by the equation: haze (%)=Td/Tt×100 (Td: diffuse transmittance, Tt: total transmittance). When the calculated haze value was 50% or smaller (0 to 50%), it was determined to be miscible and when it was greater than 50%, it was determined to be immiscible.

It is noted that regarding the evaluation of the miscibility, with respect to the prepared PSA sheet, it is preferable to determine it to be miscible when its haze value is 45% or smaller and immiscible when it is greater than 45%, or it is more preferable to determine it to be miscible when its haze value is 40% or smaller and immiscible when it is greater than 40%.

Table 3 shows the evaluation results of the haze values with respect to the pairs of the (meth)acrylic polymer and the tackifier used in Examples and Comparative Examples described above.

TABLE 3

| | | Haze value (%) Water-dispersed (meth)acrylic polymer | |
|---|---|---|---|
| | | A | B |
| Tackifying resin | R-1050 | 68.8 | 70.5 |
| | NS-100H | 0.8 | 1.2 |

(4) Adhesive Strength

Each of the PSA sheets obtained in Examples and Comparative Examples was cut to a size of 20 mm by 100 mm, and under an atmosphere at a measurement temperature (25° C., −5° C.), this was adhered to, as an adherend, a SUS304 stainless steel plate or a polypropylene (PP) plate (trade name "PP-N-AN" available from Shin-Kobe Machinery Co., Ltd.) and pressure-bonded with a 2 kg roller moved back and forth once. The resultant was then left under an atmosphere at a measurement temperature (25° C. or −5° C.) for 30 minutes, and in an atmosphere at 25° C. or −5° C., it was subjected to a peel test at a peeling angle of 180° and a peeling speed of 300 mm/min to measure the adhesive strength. The results are shown in Table 4.

(5) Dynamic Viscoelastic Measurement of PSA Sheet

Each of the water-dispersed PSA compositions obtained in Examples and Comparative Examples was applied to coat a release sheet (trade name "DIAFOIL MRF-38" available from Mitsubishi Plastics, Inc.) so as to obtain a thickness of 60 μm after dried and this was allowed to dry at 100° C. for 3 minutes to prepare a PSA sheet.

The PSA sheet was released from the release sheet and a few PSA layers were laminated to prepare a laminate of about 2 mm thick and from this, a 7.9 mm diameter measurement sample was cut out.

The measurement sample was placed between 7.9 mm diameter parallel discs, and using "Advanced Rheometric Expansion System" available from Rheometric Scientific, Inc., while applying shear strain at a frequency of 1 Hz, at a heating rate of 5° C./min, the storage modulus (G') was measured over a range of −70° C. to 100° C. The results are shown in Table 4.

Although Table 4 shows only the storage modulus (G') values at −15° C. and 25° C., with the PSA sheets obtained in the present Examples, as shown in FIG. 1, the G' at −15° C. has the greatest value within a range of −15° C. to −25° C.; and therefore, if the G' value at −15° C. is 1 MPa or smaller, the G' values over −15° C. to 25° C. are 1 MPa or smaller.

(6) Solvent-Insoluble Portion (Gel Fraction)

Each of the water-dispersed PSA compositions obtained in Examples and Comparative Examples was applied to coat a release sheet (trade name "DIAFOIL MRF-38" available from Mitsubishi Plastics, Inc.) so as to obtain a thickness of 60 μm after dried and this was allowed to dry at 100° C. for 3 minutes to prepare a PSA sheet.

The PSA sheet was released from its release sheet, and 100 mg of the PSA layer alone was placed on a porous polytetrafluoroethylene membrane having an average pore diameter of 0.2 μm, wrapped into a pouch and the opening was tied with twine, with the porous membrane and the twine having been pre-weighed together (Wa mg); and then this pouch was weighed (Wb mg).

This pouch was placed in a screw vial of volume 50 mL and the screw vial was filled with toluene. After this was left at room temperature for 7 days, the pouch was removed, allowed to dry at 130° C. for 2 hours, and the pouch was weighed (Wc mg). The gel fraction was determined by the next equation:

Gel fraction (%)=(Wc−Wa)/(Wb−Wa)×100

The results are shown in Table 4.

temperature of −53° C.; "SB0561" refers to a styrene-butadiene latex (trade name "SB-0561" available from JSR Corporation), of which the loss tangent peak temperature was −45° C.; "SB0589" refers to a styrene-butadiene latex (trade name "SB-0589" available from JSR Corporation), of which the loss tangent peak temperature was 21° C.; "SB0533" refers to a styrene-butadiene latex (trade name "SB-0533" available from JSR Corporation), of which the loss tangent peak temperature was 0° C.; "SB0568" refers to styrene-

TABLE 4

| | Acrylic Polymer (parts by weight of solid contents) | | Rubber Component (parts by weight of solid contents) | | | | | | | | Tackifier (parts by weight of solid contents) | |
|---|---|---|---|---|---|---|---|---|---|---|---|---|
| | Synthesis Example1 | Synthesis Example 2 | IR-100K | SB 0561 | SB 0589 | SB 0533 | SB 0668 | SB 2877A | MG-25 | LX-513 | R-1050 | NS-100H |
| Example 1 | 70 | | 30 | | | | | | | | 12 | |
| Example 2 | 70 | | 30 | | | | | | | | 6 | |
| Example 3 | 70 | | 30 | | | | | | | | 18 | |
| Example 4 | 70 | | 30 | | | | | | | | 24 | |
| Example 5 | 70 | | 30 | | | | | | | | 12 | |
| Example 6 | 90 | | 10 | | | | | | | | 4 | |
| Example 7 | 50 | | 50 | | | | | | | | 30 | |
| Example 8 | 50 | | 50 | | | | | | | | 40 | |
| Example 9 | 30 | | 70 | | | | | | | | 56 | |
| Example 10 | 70 | | | 30 | | | | | | | 12 | |
| Example 11 | 70 | | | | | | | 30 | | | 12 | |
| Example 12 | 70 | | 30 | | | | | | | | 12 | 3.6 |
| Example 13 | | 70 | 30 | | | | | | | | 12 | |
| Example 14 | 70 | | | | | | | | | 30 | 18 | |
| Comparative Example 1 | 100 | | | | | | | | | | | |
| Comparative Example 2 | 100 | | | | | | | | | | 20 | |
| Comparative Example 3 | 90 | | 10 | | | | | | | | 0 | |
| Comparative Example 4 | 70 | | 30 | | | | | | | | 0 | |
| Comparative Example 5 | 90 | | 10 | | | | | | | | 18 | |
| Comparative Example 6 | 70 | | | | 30 | | | | | | 12 | |
| Comparative Example 7 | 70 | | | | | 30 | | | | | 12 | |
| Comparative Example 8 | 70 | | | | | | 30 | | | | 12 | |
| Comparative Example 9 | 70 | | | | | | | | 30 | | | 14 |

| | Crosslinking Agent (parts by weight) | Dynamic Viscoelasticity G' (MPa) | | PP Adhesive Strength (N/20 mm) | | SUS Adhesive Strength (N/20 mm) | | Gel Fraction |
|---|---|---|---|---|---|---|---|---|
| | T/C | 25° C. | −15° C. | 25° C. | −5° C. | 25° C. | −5° C. | (%) |
| Example 1 | | 0.20 | 0.50 | 8.2 | 5.6 | 5.6 | 7.3 | |
| Example 2 | | 0.20 | 0.48 | 6.1 | 6.0 | 5.2 | 7.4 | |
| Example 3 | 0.04 | 0.18 | 0.60 | 6.9 | 6.9 | 4.5 | 8.4 | 20 |
| Example 4 | | 0.19 | 0.65 | 7.9 | 11.2 | 5.8 | 11.9 | |
| Example 5 | 0.04 | 0.20 | 0.50 | 6.3 | 5.8 | 4.8 | 6.2 | 29 |
| Example 6 | | 0.17 | 0.66 | 5.0 | 4.8 | 4.5 | 6.6 | |
| Example 7 | 0.04 | 0.16 | 0.48 | 7.0 | 9.4 | 4.5 | 9.3 | 15 |
| Example 8 | | 0.16 | 0.70 | 8.1 | 15.1 | 6.7 | 13.8 | |
| Example 9 | | 0.16 | 0.74 | 7.7 | 16.6 | 6.0 | 14.7 | |
| Example 10 | | 0.32 | 0.94 | 6.6 | 4.2 | 4.5 | 6.0 | |
| Example 11 | | 0.24 | 2.96 | 7.6 | 4.7 | 5.6 | 8.5 | |
| Example 12 | | 0.20 | 0.80 | 7.3 | 7.1 | 4.9 | 7.3 | |
| Example 13 | 0.06 | | | 6.8 | 6.3 | 5.0 | 6.3 | 48 |
| Example 14 | | 0.34 | 0.99 | 7.8 | 5.8 | 6.3 | 5.4 | |
| Comparative Example 1 | | 0.18 | 0.60 | 4.2 | 4.4 | 5.0 | 6.7 | |
| Comparative Example 2 | | 0.16 | 3.31 | 7.6 | 1.3 | 7.8 | 11.2 | |
| Comparative Example 3 | | 0.19 | 0.60 | 3.8 | 3.6 | 4.2 | 6.8 | |
| Comparative Example 4 | | 0.22 | 0.48 | 5.6 | 3.5 | 4.6 | 7.0 | |
| Comparative Example 5 | | 0.18 | 2.10 | 7.6 | 1.9 | 8.8 | 8.1 | |
| Comparative Example 6 | | ≥10 | ≥10 | 2.3 | 0.3 | 4.5 | 1.3 | |
| Comparative Example 7 | | 0.86 | ≥10 | 4.3 | 0.8 | 5.4 | 1.3 | |
| Comparative Example 8 | | 0.76 | ≥10 | 3.7 | 0.5 | 5.5 | 2.2 | |
| Comparative Example 9 | | 0.32 | 3.9 | 4.5 | 2.7 | 5.6 | 4.4 | |

It is noted that in Tables 1 to 4, "IR-100K" refers to a synthetic polyisoprene latex (trade name "SEPOLEX IR-100K" available from Sumitomo Seika Chemicals Co., Ltd.), of which the rubber component had a loss tangent peak butadiene latex (trade name "SB-0568" available from JSR Corporation), of which the loss tangent peak temperature was −4° C.; "SB2877A" refers to a styrene-butadiene latex (trade name "SB-2877A" available from JSR Corporation), of which the tangent peak temperature was −26° C.; "MG-25" refers to a MMA-grafted natural rubber latex (trade name "REGITEX MG-25" available from Regitex Corporation), of which the loss tangent peak temperature was −58° C.; "LX-513" refers to an acrylonitrile-butadiene latex (trade name "NIPOL LX-513" available from Zeon Corporation), of which the loss tangent peak temperature was −28° C.

In Tables 1 to 4, "R-1050", "NS-100H", and "T/C" refer to an aromatic modified terpene resin emulsion (trade name "NANOLET R-1050" available from Yasuhara Chemical Co., Ltd., softening point 100° C.), a rosin-based tackifier (trade name "SUPER ESTER NS-100H" available from Arakawa Chemical Industries, Ltd., softening point 100° C.), and an epoxy-based crosslinking agent (trade name "TETRAD-C" available from Mitsubishi Gas Chemical Company, Inc.), respectively.

As shown in Table 4, the PSA sheets according to the present invention were confirmed to have an adhesive strength to a PP plate at 25° C. of 5.0 N/20 mm or greater as well as an adhesive strength to a PP plate at −5° C. of 4.0 N/20 mm or greater, have good adhesiveness to a non-polar adherend and also maintain its properties at a low temperature.

Additionally, the PSA sheets according to the present invention were confirmed to have an adhesive strength to a SUS plate at 25° C. of 4.5 N/20 mm or greater as well as an adhesive strength to a SUS plate at −5° C. of 6.0 N/20 mm or greater, have good adhesiveness to a polar adherend and also maintain its properties at a low temperature.

The present invention is not limited to the respective embodiments described above and can be modified in a variety of ways within the ranges described in the claims. The technical scope of the present invention encompasses embodiments obtained by suitably combining technical means disclosed respectively in the different embodiments.

INDUSTRIAL APPLICABILITY

The water-dispersed PSA composition according to the present invention is capable of forming a PSA that exhibits good adhesiveness to a non-polar adherend such as polyethylene and polypropylene and also maintain its properties even at a low temperature. Therefore, it can be preferably used for a variety of PSA sheets.

| [Reference Signs List] | |
| --- | --- |
| 1 | substrate |
| 2 | PSA layer |
| 3 | release sheet |

The invention claimed is:

1. A water-dispersed pressure-sensitive adhesive composition comprising a (meth)acrylic polymer, a latex containing a rubber component, and a tackifier, wherein:
   the (meth)acrylic polymer is obtained by polymerizing a monomer composition comprising as a primary component an alkyl (meth)acrylate having an alkyl group with 1 to 18 carbon atoms;
   the rubber component is immiscible with the (meth)acrylic polymer and has a loss tangent peak temperature of −5° C. or below when determined by a dynamic viscoelastic measurement in which shear strain is applied at a frequency of 1 Hz.; and
   the tackifier is miscible with the rubber component, but immiscible with the (meth)acrylic polymer.

2. The water-dispersed pressure-sensitive adhesive composition according to claim 1, wherein the ratio of the (meth)acrylic polymer to the latex to be mixed ((meth)acrylic polymer/rubber-based latex) is within a range of 95/5 to 25/75 based on their solid contents.

3. The water-dispersed pressure-sensitive adhesive composition according to claim 1, wherein the tackifier is contained in an amount within a range of 5 to 100 parts by weight relative to 100 parts by weight of solid contents of the latex.

4. The water-dispersed pressure-sensitive adhesive composition according to claim 1, wherein, when the water-dispersed pressure-sensitive adhesive composition is dried, it has a storage modulus of 1 MPa or smaller over a range of −15° C. to 25° C. when determined by a dynamic viscoelastic measurement in which shear strain is applied at a frequency of 1 Hz.

5. The water-dispersed pressure-sensitive adhesive composition according to claim 1, wherein the rubber component contained in the latex is at least one kind selected from a group consisting of natural rubber, synthetic polyisoprene rubber, polybutadiene rubber, acrylonitrile-butadiene rubber and styrene-butadiene rubber.

6. The water-dispersed pressure-sensitive adhesive composition according to claim 1, wherein the tackifier has a softening point of 80° C. to 150° C.

7. A pressure-sensitive adhesive formed of the water-dispersed pressure-sensitive adhesive composition according to claim 1.

8. A pressure-sensitive adhesive sheet comprising a pressure-sensitive adhesive layer formed of the water-dispersed pressure-sensitive adhesive composition according to claim 1.

9. The water-dispersed pressure-sensitive adhesive composition according to claim 2, wherein the tackifier is contained in an amount within a range of 5 to 100 parts by weight relative to 100 parts by weight of solid contents of the latex.

10. The water-dispersed pressure-sensitive adhesive composition according to claim 2, wherein, when the water-dispersed pressure-sensitive adhesive composition is dried, it has a storage modulus of 1 MPa or smaller over a range of −15° C. to 25° C. when determined by a dynamic viscoelastic measurement in which shear strain is applied at a frequency of 1 Hz.

11. The water-dispersed pressure-sensitive adhesive composition according to claim 2, wherein the rubber component contained in the latex is at least one kind selected from a group consisting of natural rubber, synthetic polyisoprene rubber, polybutadiene rubber, acrylonitrile-butadiene rubber and styrene-butadiene rubber.

12. The water-dispersed pressure-sensitive adhesive composition according to claim 2, wherein the tackifier has a softening point of 80° C. to 150° C.

13. A pressure-sensitive adhesive formed of the water-dispersed pressure-sensitive adhesive composition according to claim 2.

14. A pressure-sensitive adhesive sheet comprising a pressure-sensitive adhesive layer formed of the water-dispersed pressure-sensitive adhesive composition according to claim 2.

15. The water-dispersed pressure-sensitive adhesive composition according to claim 3, wherein, when the water-dispersed pressure-sensitive adhesive composition is dried, it has a storage modulus of 1 MPa or smaller over a range of −15° C. to 25° C. when determined by a dynamic viscoelastic measurement in which shear strain is applied at a frequency of 1 Hz.

16. The water-dispersed pressure-sensitive adhesive composition according to claim 3, wherein the rubber component contained in the latex is at least one kind selected from a group consisting of natural rubber, synthetic polyisoprene rubber, polybutadiene rubber, acrylonitrile-butadiene rubber and styrene-butadiene rubber.

17. The water-dispersed pressure-sensitive adhesive composition according to claim 3, wherein the tackifier has a softening point of 80° C. to 150° C.

18. A pressure-sensitive adhesive formed of the water-dispersed pressure-sensitive adhesive composition according to claim 3.

19. A pressure-sensitive adhesive sheet comprising a pressure-sensitive adhesive layer formed of the water-dispersed pressure-sensitive adhesive composition according to claim 3.

20. The water-dispersed pressure-sensitive adhesive composition according to claim 4, wherein the rubber component contained in the latex is at least one kind selected from a group consisting of natural rubber, synthetic polyisoprene rubber, polybutadiene rubber, acrylonitrile-butadiene rubber and styrene-butadiene rubber.

\* \* \* \* \*